US011470544B2

(12) United States Patent
Singh et al.

(10) Patent No.: US 11,470,544 B2
(45) Date of Patent: Oct. 11, 2022

(54) METHODS, SYSTEMS, AND COMPUTER READABLE MEDIA FOR OPTIMIZED ROUTING OF MESSAGES RELATING TO EXISTING NETWORK FUNCTION (NF) SUBSCRIPTIONS USING AN INTERMEDIATE FORWARDING NF REPOSITORY FUNCTION (NRF)

(71) Applicant: Oracle International Corporation, Redwood Shores, CA (US)

(72) Inventors: Virendra Singh, Bangalore (IN); Jay Rajput, Bangalore (IN); Doki Satish Kumar Patro, Bangalore (IN); Kawal Sapra, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/156,149

(22) Filed: Jan. 22, 2021

(65) Prior Publication Data
US 2022/0240171 A1   Jul. 28, 2022

(51) Int. Cl.
*H04W 48/18* (2009.01)
*H04W 40/24* (2009.01)
(Continued)

(52) U.S. Cl.
CPC ............ *H04W 48/18* (2013.01); *H04W 8/18* (2013.01); *H04W 24/02* (2013.01); *H04W 40/246* (2013.01); *H04W 48/16* (2013.01)

(58) Field of Classification Search
CPC ....... H04W 48/16; H04W 48/18; H04W 8/18; H04W 24/02; H04W 40/246
See application file for complete search history.

(56) References Cited

U.S. PATENT DOCUMENTS 6,725,278 B1   4/2004 Gonzalez
6,748,435 B1   6/2004 Wang et al.
(Continued)

FOREIGN PATENT DOCUMENTS

CN   101366311 A   2/2009
CN   101512971 A   8/2009
(Continued)

OTHER PUBLICATIONS

"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).

(Continued)

*Primary Examiner* — Wayne H Cai
(74) *Attorney, Agent, or Firm* — Jenkins, Wilson, Taylor & Hunt, P.A.

(57) ABSTRACT

A method for routing messages relating to existing NF subscriptions includes receiving, at a first NRF, a request from a consumer NF instance creating a first NF subscription, determining that the first NRF does not have the requested NF profile, and forwarding the request to a second NRF. The method further includes receiving a response from the second NRF indicating that the second NRF has created the first NF subscription, modifying the response so that subsequent messages associated with the first subscription will be sent to the first NRF, and forwarding the response to the consumer NF instance. The method further includes receiving, by the first NRF, a message from the consumer NF instance relating to the first subscription, determining, that the second NRF is unavailable, and forwarding the message relating to the first subscription to a third NRF that functions as a mate of the second NRF.

20 Claims, 10 Drawing Sheets

(51) Int. Cl.
  *H04W 8/18* (2009.01)
  *H04W 24/02* (2009.01)
  *H04W 48/16* (2009.01)

(56) References Cited

U.S. PATENT DOCUMENTS

| | | |
|---|---|---|
| 7,151,945 B2 | 12/2006 | Myles et al. |
| 7,706,822 B2 | 4/2010 | Emeott et al. |
| 8,306,034 B2 | 11/2012 | Jang et al. |
| 8,620,858 B2 | 12/2013 | Backholm et al. |
| 8,767,705 B2 | 7/2014 | Göppner et al. |
| 8,811,228 B2 | 8/2014 | Lopez et al. |
| 8,811,372 B2 | 8/2014 | Li et al. |
| 8,824,449 B2 | 9/2014 | van der Wateren et al. |
| 9,246,762 B1 | 1/2016 | Watkins |
| 9,386,551 B2 | 7/2016 | Zhou et al. |
| 9,667,590 B2 | 5/2017 | Yan et al. |
| 10,097,504 B2 | 10/2018 | Backholm |
| 10,299,128 B1 | 5/2019 | Suthar et al. |
| 10,361,843 B1 | 7/2019 | Suthar et al. |
| 10,595,256 B1 | 3/2020 | Marupaduga et al. |
| 10,609,154 B2 | 3/2020 | Talebi Fard et al. |
| 10,616,934 B2 | 4/2020 | Talebi Fard et al. |
| 10,637,753 B1 | 4/2020 | Taft et al. |
| 10,652,098 B2 | 5/2020 | Kim |
| 10,772,062 B1 | 9/2020 | Albasheir et al. |
| 10,778,527 B2 | 9/2020 | Assali et al. |
| 10,791,044 B1 | 9/2020 | Krishan et al. |
| 10,819,636 B1 | 10/2020 | Goel |
| 10,833,938 B1 | 11/2020 | Rajput et al. |
| 11,224,009 B2 | 1/2022 | Krishan |
| 11,271,846 B2 | 3/2022 | Krishan |
| 11,290,549 B2 | 3/2022 | Krishan |
| 2004/0062278 A1 | 4/2004 | Hadzic et al. |
| 2004/0208183 A1 | 10/2004 | Balachandran et al. |
| 2005/0193096 A1 | 9/2005 | Yu et al. |
| 2005/0232407 A1 | 10/2005 | Craig et al. |
| 2006/0010224 A1 | 1/2006 | Sekar et al. |
| 2007/0050331 A1 | 3/2007 | Bauman et al. |
| 2007/0242738 A1 | 10/2007 | Park et al. |
| 2008/0165761 A1 | 7/2008 | Goppner et al. |
| 2009/0006652 A1 | 1/2009 | Kasatani |
| 2009/0024727 A1 | 1/2009 | Jeon et al. |
| 2009/0055835 A1 | 2/2009 | Zhu |
| 2009/0141625 A1 | 6/2009 | Ghai et al. |
| 2011/0078674 A1 | 3/2011 | Ershov |
| 2011/0202604 A1 | 8/2011 | Craig et al. |
| 2013/0029708 A1 | 1/2013 | Fox et al. |
| 2013/0198269 A1 | 8/2013 | Fleischman et al. |
| 2013/0272123 A1 | 10/2013 | Lee et al. |
| 2014/0075004 A1 | 3/2014 | Van Dusen et al. |
| 2014/0379901 A1 | 12/2014 | Tseitlin et al. |
| 2015/0039560 A1 | 2/2015 | Barker et al. |
| 2015/0071074 A1 | 3/2015 | Zaidi et al. |
| 2015/0119101 A1 | 4/2015 | Cui et al. |
| 2016/0156513 A1 | 6/2016 | Zhang et al. |
| 2016/0352588 A1 | 12/2016 | Subbarayan et al. |
| 2016/0380906 A1 | 12/2016 | Hodique et al. |
| 2017/0221015 A1 | 8/2017 | June et al. |
| 2018/0039494 A1 | 2/2018 | Lander et al. |
| 2018/0083882 A1 | 3/2018 | Krishan et al. |
| 2018/0213391 A1 | 7/2018 | Inoue |
| 2018/0262592 A1 | 9/2018 | Zandi et al. |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2018/0324646 A1 | 11/2018 | Lee et al. |
| 2018/0343567 A1 | 11/2018 | Ashrafi |
| 2019/0007366 A1 | 1/2019 | Voegele et al. |
| 2019/0045351 A1 | 2/2019 | Zee et al. |
| 2019/0075552 A1 | 3/2019 | Yu et al. |
| 2019/0116486 A1 | 4/2019 | Kim et al. |
| 2019/0116521 A1 | 4/2019 | Qiao et al. |
| 2019/0140895 A1 | 5/2019 | Ennis, Jr. et al. |
| 2019/0158364 A1 | 5/2019 | Zhang et al. |
| 2019/0173740 A1 | 6/2019 | Zhang et al. |
| 2019/0174561 A1 | 6/2019 | Sivavakeesar |
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0222633 A1 | 7/2019 | Howes et al. |
| 2019/0223093 A1 | 7/2019 | Watfa et al. |
| 2019/0230556 A1 | 7/2019 | Lee |
| 2019/0261244 A1 | 8/2019 | Jung et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Khinvasara et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0357216 A1 | 11/2019 | Jung et al. |
| 2019/0370028 A1 | 12/2019 | Shi et al. |
| 2019/0380031 A1 | 12/2019 | Suthar et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0008069 A1 | 1/2020 | Zhu et al. |
| 2020/0028920 A1 | 1/2020 | Livanos et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0084663 A1 | 3/2020 | Park et al. |
| 2020/0092423 A1 | 3/2020 | Qiao et al. |
| 2020/0092424 A1 | 3/2020 | Qiao et al. |
| 2020/0106812 A1 | 4/2020 | Verma et al. |
| 2020/0127916 A1 | 4/2020 | Krishan |
| 2020/0136911 A1 | 4/2020 | Assali et al. |
| 2020/0137174 A1* | 4/2020 | Stammers ............... H04L 67/16 |
| 2020/0305033 A1 | 9/2020 | Keller et al. |
| 2020/0313996 A1 | 10/2020 | Krishan et al. |
| 2020/0314615 A1 | 10/2020 | Patil et al. |
| 2020/0336554 A1 | 10/2020 | Deshpande et al. |
| 2020/0404608 A1 | 12/2020 | Albasheir et al. |
| 2021/0007023 A1 | 1/2021 | Umapathy et al. |
| 2021/0044481 A1 | 2/2021 | Xu et al. |
| 2021/0168055 A1 | 6/2021 | Lair |
| 2021/0204200 A1 | 7/2021 | Krishan et al. |
| 2021/0235254 A1 | 7/2021 | Farooq |
| 2021/0274392 A1 | 9/2021 | Dao et al. |
| 2021/0385732 A1 | 12/2021 | Reyes et al. |
| 2022/0015023 A1* | 1/2022 | De-Gregorio-Rodriguez ............. H04W 4/50 |
| 2022/0038999 A1 | 2/2022 | Sapra et al. |
| 2022/0060547 A1 | 2/2022 | Krishan |
| 2022/0070648 A1 | 3/2022 | Krishan |

FOREIGN PATENT DOCUMENTS

| | | |
|---|---|---|
| CN | 105635345 B | 2/2019 |
| WO | WO 2017/143915 A1 | 8/2017 |
| WO | WO 2018/174021 A1 | 9/2018 |
| WO | WO 2018/174516 A1 | 9/2018 |
| WO | WO 2019/034609 A1 | 2/2019 |
| WO | WO 2019/193129 A1 | 10/2019 |
| WO | WO 2019/220172 A1 | 11/2019 |
| WO | WO 2020/091934 A1 | 5/2020 |
| WO | WO 2020/263486 A1 | 12/2020 |
| WO | WO 2021/040827 A1 | 3/2021 |
| WO | WO 2021/138074 A1 | 7/2021 |
| WO | WO 2022/025987 A1 | 2/2022 |
| WO | WO 2022/025988 A1 | 2/2022 |
| WO | WO 2022/046170 A1 | 3/2022 |

(56) References Cited

FOREIGN PATENT DOCUMENTS

| WO | WO 2022/050987 A1 | 3/2022 |
|----|-------------------|--------|
| WO | WO 2022/093319 A1 | 5/2022 |

OTHER PUBLICATIONS

"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).

"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).

"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).

Notification of Transmittal of the International Search Report and the Written Opinion of the International Searching Authority, or the Declaration for U.S. Patent Application Serial No. PCT/US2021/020122 (dated Jun. 1, 2021).

Notification of Transmittal of the International Search Report and the Written Opinion of the International Searching Authority, or the Declaration for U.S. Patent Application Serial No. PCT/US2021/020121 (dated Jun. 1, 2021).

Notice of Allowance and Fee(s) Due for U.S. Appl. No. 17/001,599 (dated May 17, 2021).

Applicant-Initiated Interview Summary for U.S. Appl. No. 17/001,599 (dated May 5, 2021).

Commonly-assigned, co-pending U.S. Appl. No. 17/193,337 for "Methods, Systems, and Computer Readable Media for Selecting Multiple Network Function Types Using a Single Discovery Request," (Unpublished, filed Mar. 5, 2021).

Commonly-assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).

Commonly-assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).

"3rd Generation Partnership Project; Technical Specification Group Services and System Aspects; System architecture for the 5G System (5GS); Stage 2 (Release 16)," 3GPP TS 23.501 V16.5.1, pp. 1-440 (Aug. 2020).

Commonly-assigned, co-pending U.S. Appl. No. 16/942,713 for "Methods, Systems, and Computer Readable Media for Providing Network Function Discovery Service Enhancements," (Unpublished, filed Jul. 29, 2020).

"3rd Generation Partnership Project; Technical Specification Group Core Network and Terminals; 5G System; Network Function Repository Services; Stage 3 (Release 16)," 3GPP TS 29.510 V16.4.0, pp. 1-192 (Jul. 2020).

"3rd Generation Partnership Project; Technical Specification Group Core Network and Terminals; 5G System; Technical Realization of Service Based Architecture; Stage 3 (Release 16)," 3GPP TS 29.500 V16.4.0 pp. 1-79 (Jun. 2020).

"3rd Generation Partnership Project; Technical Specification Group Services and System Aspects; Procedures for the 5G System (5GS); Stage 2," 3GPP TS 23.502 V16.4.0 pp. 1-582 (Mar. 2020).

"3rd Generation Partnership Project; Technical Specification Group Core Network and Terminals; 5G System; Network Function Repository Services; Stage 3 (Release 16)," 3GPP TS 29.510, V16.0.0, pp. 1-135 (Jun. 2019).

Huawei, "eSBA: reselection of producer instance," 3GPP TSG-SA2 Meeting #132, pp. 1-2 (Apr. 12, 2019).

Docomo, "Update Solution 4 for implicit registration," SA WG2 Meeting #129, pp. 1-2 (Oct. 15-19, 2018).

Notice of Allowance and Fee(s) Due for U.S. Appl. No. 16/730,799 (dated Jul. 30, 2021).

Notification of Transmittal of the International Search Report and the Written Opinion of the International Searching Authority, or the Declaration for International Application No. PCT/US2021/024000 (dated Jun. 24, 2021).

Notification of Transmittal of the International Search Report and the Written Opinion of the International Searching Authority, or the Declaration for U.S. Patent Application Serial No. PCT/US2021/020120 (dated Jun. 1, 2021).

"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).

Nokia et al., "Discussion paper on authorization for Model D Indirect communications", 3GPP TSG SA WG3; S3-194380 (Nov. 11, 2019).

Non-Final Office Action for U.S. Appl. No. 16/356,446 (dated Jun. 16, 2021).

Notification of Transmittal of the International Search Report and the Written Opinion of the International Searching Authority, or the Declaration for International Application Serial No. PCT/US2020/065765 (dated Apr. 15, 2021).

Ex Parte Quayle Action for U.S. Appl. No. 16/730,799 (Apr. 7, 2021).

International Search Report and Written Opinion for Patent Cooperation Treaty Application Serial No. PCT/US2020/061885 (dated Feb. 4, 2021).

International Search Report and Written Opinion for Patent Cooperation Treaty Application Serial No. PCT/US2020/057712 (dated Feb. 2, 2021).

Cheshire, S. et al., "Apple's DNS Long-Lived Queries protocol draft-sekar-dns-llq-06," Internet Engineering Task Force (IETF), pp. 1-26 (Aug. 23, 2019).

Advisory Action for U.S. Appl. No. 16/356,446 (dated Dec. 22, 2020).

Notice of Allowance and Fee(s) Due for U.S. Appl. No. 16/555,817 (dated Dec. 3, 2020).

Commonly-assigned, co-pending U.S. Appl. No. 17/082,871 for "Methods, Systems, and Computer Readable Media for Rank Processing for Network Function Selection," (Unpublished, filed Oct. 28, 2020).

Commonly-assigned, co-pending U.S. Continuation-in-Part U.S. Appl. No. 17/074,553 for "Methods, Systems, and Computer Readable Media for Actively Discovering and Tracking Addresses Associated with 4G Service Endpoints," (Unpublished, filed Oct. 19, 2020).

"P-GW Administration Guide, StarOS Release 21.20," Cisco, pp. 1-1164 (Oct. 11, 2020).

"3rd Generation Partnership Project; Technical Specification Group Core Network and Terminals; Non-Access-Stratum (NAS) protocol for Evolved Packet System (EPS); Stage 3 (Release 17)," 3GPP TS 24.301, V17.0.0, pp. 1-585 (Sep. 2020).

3rd Generation Partnership Project; Technical Specification Group Services and System Aspects; Architecture enhancements to facilitate communications with packet data networks and applications (Release 16), 3GPP TS 23.682, V16.8.0, pp. 1-135 (Sep. 2020).

Non-Final Office Action for U.S. Appl. No. 16/697,021 (dated Sep. 29, 2020).

Notice of Allowance and Fee(s) Due for U.S. Appl. No. 16/527,988 (dated Sep. 17, 2020).

Final Office Action for U.S. Appl. No. 16/356,446 (dated Sep. 8, 2020).

Commonly-assigned, co-pending U.S. Appl. No. 16/945,794 for "Methods, Systems, And Computer Readable Media For Preferred Network Function (NF) Location Routing Using Service Communications Proxy (SCP)," (Unpublished, filed Jul. 31, 2020).

Ex Parte Quayle Action for U.S. Appl. No. 16/527,988 (Jun. 1, 2020).

Notice of Allowance and Fee(s) Due for U.S. Appl. No. 16/369,691 (dated May 12, 2020).

(56) References Cited

OTHER PUBLICATIONS

Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
Non-Final Office Action for U.S. Appl. No. 16/176,920 (dated Mar. 6, 2020).
"3rd Generation Partnership Project; Technical Specification Group Services and System Aspects; System architecture for the 5G System (5GS); Stage 2 (Release 16)," 3GPP TS 23.501 V16.4.0, pp. 1-430 (Mar. 2020).
Notification of Transmittal of the International Search Report and the Written Opinion of the International Searching Authority, or the Declaration for International Application Serial No. PCT/US2019/053912 (dated Dec. 18, 2019).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Commonly-assigned, co-pending U.S. Appl. No. 16/527,988 for "Methods, Systems, and Computer Readable Media for Network Function (NF) Topology Synchronization," (Unpublished, filed Jul. 31, 2019).
"3rd Generation Partnership Project; Technical Specification Group Core Network and Terminals; 5G System; Network Function Repository Services; Stage 3 (Release 15)," 3GPP TS 29.510, V15.4.0, pp. 1-127 (Jun. 2019).
Commonly-assigned, co-pending U.S. Appl. No. 16/369,691 for "Methods, System, and Computer Readable Media for Handling Multiple Versions of Same Service Provided by Producer Network Functions (NFs)," (Unpublished, filed Mar. 29, 2019).
Commonly-assigned, co-pending U.S. Appl. No. 16/356,446 for "Methods, Systems, And Computer Readable Media For Locality-Based Selection And Routing Of Traffic To Producer Network Functions (NFs)," (Unpublished, filed Mar. 18, 2019).
"3rd Generation Partnership Project; Technical Specification Group Network and Terminals; 5G Systems; Network Function Repository Services; Stage 3 (Release 15)," 3GPP TS 29.510, V15.2.0, pp. 1-113 (Dec. 2018).
"3rd Generation Partnership Project; Technical Specification Group Network and Terminals; 5G Systems; Principles and Guidelines for Services Definition; Stage 3 (Release 15)," 3GPP TS 29.501, V15.2.0, pp. 1-66 (Dec. 2018).
"3rd Generation Partnership Project; Technical Specification Group Services and System Aspects; Study on Enhancements to the Service-Based Architecture (Release 16)," 3GPP TR 23.742, V16.0.0, pp. 1-131 (Dec. 2018).
Commonly-assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"5G; 5G System; Network function repository services; Stage 3 (3GPP TS 29.510 version 15.1.0 Release 15)," ETSI TS 129 510, V15.1.0, pp. 1-87 (Oct. 2018).
"5G; 5G System; Unified Data Repository Services; Stage 3 (3GPP TS 29.504 version 15.1.0 Release 15)," ETSI TS 129 504, V15.1.0, pp. 1-26 (Oct. 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
"Cisco Ultra 5G Packet Core Solution," Cisco, White paper, https://www.cisco.com/c/dam/en/us/products/collateral/routers/network-convergence-system-500-series-routers/white-paper-c11-740360.pdf, pp. 1-11 (2018).
Li et al., "Mobile Edge Computing Platform Deployment in 4G LTE Networks: A Middlebox Approach," https://www.usenix.org/system/files/conference/hotedge18/hotedge18-papers-li.pdf, 6 pages (2018).
Mayer, "RESTful APIs for the 5G Service Based Architecture," Journal of ICT, vol. 6_1&2, pp. 101-116 (2018).
"5G Service Based Architecture (SBA)," 5G, pp. 1-61 (downloaded Dec. 24, 2018).
Scholl et al., "An API First Approach to Microservices Development," Oracle, https://blogs.oracle.com/developers/an-api-first-approach-to-microservices-development, pp. 1-12 (Nov. 8, 2017).
"Pseudo-CR on Service Discovery and Registration using NRF service," Ericsson, 3GPP TSG CT4 Meeting #79, 3GPP TR 29.891—v0.3.0, pp. 1-4 (Aug. 21-25, 2017).
"3rd Generation Partnership Project; Technical Specification Group Core Network and Terminals; Domain Name System Procedures; Stage 3 (Release 13)," 3GPP TS 29.303 V13.4.0, pp. 1-69 (Jun. 2016).
Preston-Werner, "Semantic Versioning 2.0.0", Oracle, pp. 1-5 (Jun. 2013).
"LTE and Beyond," https://ytd2525.wordpress.com/2013/03/06/lte-and-beyond/, 3 pages (2013).
Nichols et al., "Definition of the Differentiated Services Field (DS Field) in the IPv4 and IPv6 Headers," Internet Engineering Task Force (IETF) Netwok Working Group Request for Comments (RFC) 2474, The Internet Society, pp. 1-20 (Dec. 1998).
Communication of European Publication No. and Information on the Applicatoin of Article 67(3) EPC for European Patent Application Serial No. 20732441.9 (dated Apr. 6, 2022).
Non-Final Office Action for Chinese Patent Application Serial No. 201980067968.7 (dated Mar. 3, 2022).
First Examination Report for Indian Patent Application Serial No. 202147011137 (dated Mar. 9, 2022).
Final Office Action for U.S. Appl. No. 16/945,794 (dated Feb. 8, 2022).
Commonly-Assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)" (Unpublished, filed Oct. 21, 2021).
Notice of Allowance and Fee(s) Due for U.S. Appl. No. 17/001,599 (dated Nov. 17, 2021).
Notice of Allowance and Fee(s) Due for U.S. Appl. No. 16/356,446 (dated Sep. 30, 2021).
Non-Final Office Action for U.S. Appl. No. 16/945,794 (dated Sep. 15, 2021).
Notice of Allowance and Fee(s) Due for U.S. Appl. No. 16/730,799 (dated Aug. 16, 2021).

(56) References Cited

OTHER PUBLICATIONS

Communication of European publication No. and information on the application of Article 67(3) EPC for European Patent Application Serial No. 19791391.6 (dated Aug. 11, 2021).

"Implementing Quality of Service Policies with DSCP," Cisco, pp. 1-7 (Feb. 15, 2008).

Commonly-Assigned, co-pending U.S. Appl. No. 17/551,124 for "Methods, Systems, and Computer Readable Media for Enabling Forwarding of Subsequent Network Function Subscription Updates," (Unpublished, filed Dec. 14, 2021).

Notice of Allowance for U.S. Appl. No. 16/942,713 (dated Nov. 29, 2021).

Notice of Allowance for U.S. Appl. No. 17/001,599 (dated Nov. 17, 2021).

"3rd Generation Partnership Project; Technical Specification Group Core Network and Terminals; Numbering, addressing and identification; (Release 17)," 3GPP TS 23.003, V17.3.0, pp. 1-145 (Sep. 2021).

Ex Parte Quayle Action for U.S. Appl. No. 16/942,713 (dated Sep. 13, 2021).

Commonly-Assigned, co-pending U.S. Appl. No. 17/497,879 for "Methods, Systems, and Computer Readable Media for Routing Inter-Public Land Mobile Network (INTER-PLMN) Messages Related to Existing Subscriptions with Network Function (NF) Repository Function (NRF) Using Security Edge Protection Proxy (SEPP)," (Unpublished, filed Oct. 8, 2021).

Commonly-Assigned, co-pending U.S. Appl. No. 17/392,288 for "Methods, Systems, and Computer Readable Media for Optimized Routing of Service Based Interface (SBI) Request Messages to Remote Network Function (NF) Repository Functions Using Indirect Communications via Service Communications Proxy (SCP)," (Unpublished, filed Aug. 3, 2021).

"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).

Non-Final Office Action for U.S. Appl. No. 17/193,337 (dated May 11, 2022).

Advisory Action and Examiner-Initiated Interview Summary for U.S. Appl. No. 16/945,794 (dated May 20, 2022).

\* cited by examiner

METHODS, SYSTEMS, AND COMPUTER READABLE MEDIA FOR OPTIMIZED ROUTING OF MESSAGES RELATING TO EXISTING NETWORK FUNCTION (NF) SUBSCRIPTIONS USING AN INTERMEDIATE FORWARDING NF REPOSITORY FUNCTION (NRF)

TECHNICAL FIELD

The subject matter described herein relates to routing messages relating to subscriptions in telecommunications networks. More particularly, the subject matter described herein relates to methods, systems, and computer readable media for optimized routing of messages relating to existing NF subscriptions using an intermediate forwarding NRF.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communications proxy (SCP). The SCP subscribes with the NRF and obtains reachability and service profile information regarding producer NF service instances. Consumer NFs connect to the service communications proxy, and the service communications proxy load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks occurs when NRFs are deployed in a geo-redundant manner, a consumer NF that creates a subscription with a remote NRF that fails, and the consumer NF cannot contact the mate of the remote NRF because the consumer NF does not know about the mate of the remote NRF. For example, if a consumer NF sends a create subscription request to an NRF located at site 1, and the NRF at site 1 does not have NF profile information for the producer NF instance identified in the subscription request, the NRF at site 1 will forward the subscription request to another NRF, which may be located at another site, which will be referred to as site 2. the subscription is created when the NRF at site 2 accepts the request and forwards the notification of the acceptance to the consumer NF. The consumer NF then communicates directly with the NRF at site 2 for subsequent messages relating to the subscription, such as messages to modify or delete the subscription. If the NRF at site 2 fails and its processing is taken over by a geo-redundant mate NRF at site 2, the consumer NF will not be able to contact the mate remote NRF to modify or delete the subscription because the consumer NF does not have knowledge of the mate remote NRF.

Accordingly, there exists a need for methods, systems, and computer readable media for optimized routing of messages relating to existing NRF subscriptions that avoids at least some of these difficulties.

SUMMARY

A method for optimized routing of messages relating to existing network function (NF) subscriptions using an intermediate forwarding NF repository function (NRF) is provided. The method includes, at a first NRF, receiving a create subscription request from a consumer NF instance for creating a first NF subscription to receive notifications regarding a producer NF instance. The method further includes determining, by the first NRF, that the first NRF does not have an NF profile for the producer NF instance identified in the create subscription request and, in response, forwarding the create subscription request to a second NRF. The method further includes receiving, by the first NRF, a response from the second NRF indicating that the second NRF has created the first subscription, modifying the response so that subsequent messages from the consumer NF associated with the first NF subscription will be sent to the first NRF, and forwarding the response to the consumer NF instance. The method further includes receiving, by the first NRF, a message from the consumer NF instance relating to the first NF subscription. The method further includes determining, by the first NRF, that the second NRF is unavailable, and, in response, forwarding the message relating to the first NF subscription to a third NRF that functions as a mate of the second NRF. The term "mate NRF" as used herein, is intended to refer to any NRF that is capable of taking over the operations of a failed NRF when the NRF fails. Mate NRFs may exchange state information, including NF subscription information, to facilitate the switchover operation when a failure occurs. The term "mate NRF" includes any NRF in the same NRF set as another NRF.

According to another aspect of the subject matter described herein, the second and third NRFs are located at a geographically diverse site from the first NRF.

According to another aspect of the subject matter described herein, the first NRF comprises an intermediate forwarding NRF.

According to another aspect of the subject matter described herein, determining that the first NRF does not have an NF profile for the producer NF instance identified in the create subscription request includes performing a lookup in an NF profile database maintained by the first NRF using an NF instance ID obtained from the create subscription request message.

According to another aspect of the subject matter described herein, the method for optimized routing of messages relating to existing NF subscriptions at an intermediate forwarding NF includes, at the first NRF, selecting the second NRF to which the create subscription request is forwarded based on at least one of priority and capacity of the second NRF.

According to another aspect of the subject matter described herein, modifying the response includes replacing an identifier or address of the second NRF in a location header of the response with an identifier or address for the first NRF.

According to another aspect of the subject matter described herein, replacing the identifier or address of the second NRF in the location header of the response includes replacing the identifier or address of the second NRF with the identifier or address of the first NRF in an apiRoot of the location header of the response.

According to another aspect of the subject matter described herein, modifying the response includes appending an identifier or address of the second NRF to the location header of the response.

According to another aspect of the subject matter described herein, modifying the response includes using a token to separate the identifier or address of the second NRF from a subscription identifier.

According to another aspect of the subject matter described herein, receiving the message relating to the first NF subscription includes receiving a message for updating or deleting the first NF subscription.

According to another aspect of the subject matter described herein, a system for optimized routing of messages relating to existing network function (NF) subscriptions using an intermediate forwarding NF repository function (NRF) includes a first NRF including at least one processor and a memory. The system further includes an NF profiles database embodied in the memory for storing NF profiles of producer NF instances and maintaining subscriptions to the NF profiles by consumer NF instances. The system further includes an NF subscription message handler implemented by the at least one processor for: receiving a create subscription request from a consumer NF instance for creating a first NF subscription to receive notifications regarding a producer NF instance; determining, by the first NRF, that the first NRF does not have an NF profile for the producer NF instance identified in the create subscription request and, in response, forwarding the create subscription request to a second NRF; receiving a response from the second NRF indicating that the second NRF has created the first subscription, modifying the response so that subsequent messages from the consumer NF associated with the first NF subscription will be sent to the first NRF, and forwarding the response to the consumer NF instance; receiving a message from the consumer NF instance relating to the first NF subscription; and determining that the second NRF is unavailable, and, in response, forwarding the message relating to the first NF subscription to a third NRF that functions as a mate of the second NRF.

According to another aspect of the subject matter described herein, in determining that the first NRF does not have an NF profile for the producer NF instance identified in the create subscription request, the NF subscription message handler is configured to perform a lookup in the NF profile database using an NF instance ID obtained from the create subscription request.

According to another aspect of the subject matter described herein, the subscription message handler is configured to select the second NRF to which the create subscription request is forwarded based on at least one of priority and capacity of the second NRF.

According to another aspect of the subject matter described herein, in modifying the response, the NF subscription message handler is configured to replace an identifier or address of the second NRF in a location header of the response with an identifier or address for the first NRF.

According to another aspect of the subject matter described herein, in replacing the identifier or address of the second NRF in the location header of the response, the NF subscription message handler is configured to replace the identifier or address of the second NRF with the identifier or address of the first NRF in an apiRoot of the location header of the response.

According to another aspect of the subject matter described herein, in modifying the response, the NF subscription message handler is configured to append an identifier or address of the second NRF to the location header of the response and to use a token to separate the identifier or address of the second NRF from a subscription identifier.

According to another aspect of the subject matter described herein, the message relating to the first NF subscription comprises a message for updating or deleting the first NF subscription.

According to another aspect of the subject matter described herein, a non-transitory computer readable medium having stored thereon executable instructions that when executed by a processor of a computer control the computer to perform steps is provided. The steps include at a first network function (NF) repository function (NRF), receiving a create subscription request from a consumer NF instance for creating a first NF subscription to receive notifications regarding a producer NF instance. The steps further include determining, by the first NRF, that the first NRF does not have an NF profile for the producer NF instance identified in the create subscription request and, in response, forwarding the create subscription request to a second NRF. The steps further include receiving, by the first NRF, a response from the second NRF indicating that the second NRF has created the first NF subscription, modifying the response so that subsequent messages from the consumer NF associated with the first NF subscription will be sent to the first NRF, and forwarding the response to the consumer NF instance. The steps further include receiving, by the first NRF, a message from the consumer NF instance relating to the first NF subscription. The steps further include determining, by the first NRF, that the second NRF is unavailable, and, in response, forwarding the message relating to the first NF subscription to a third NRF that functions as a mate of the second NRF.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

DETAILED DESCRIPTION

Figure 1:
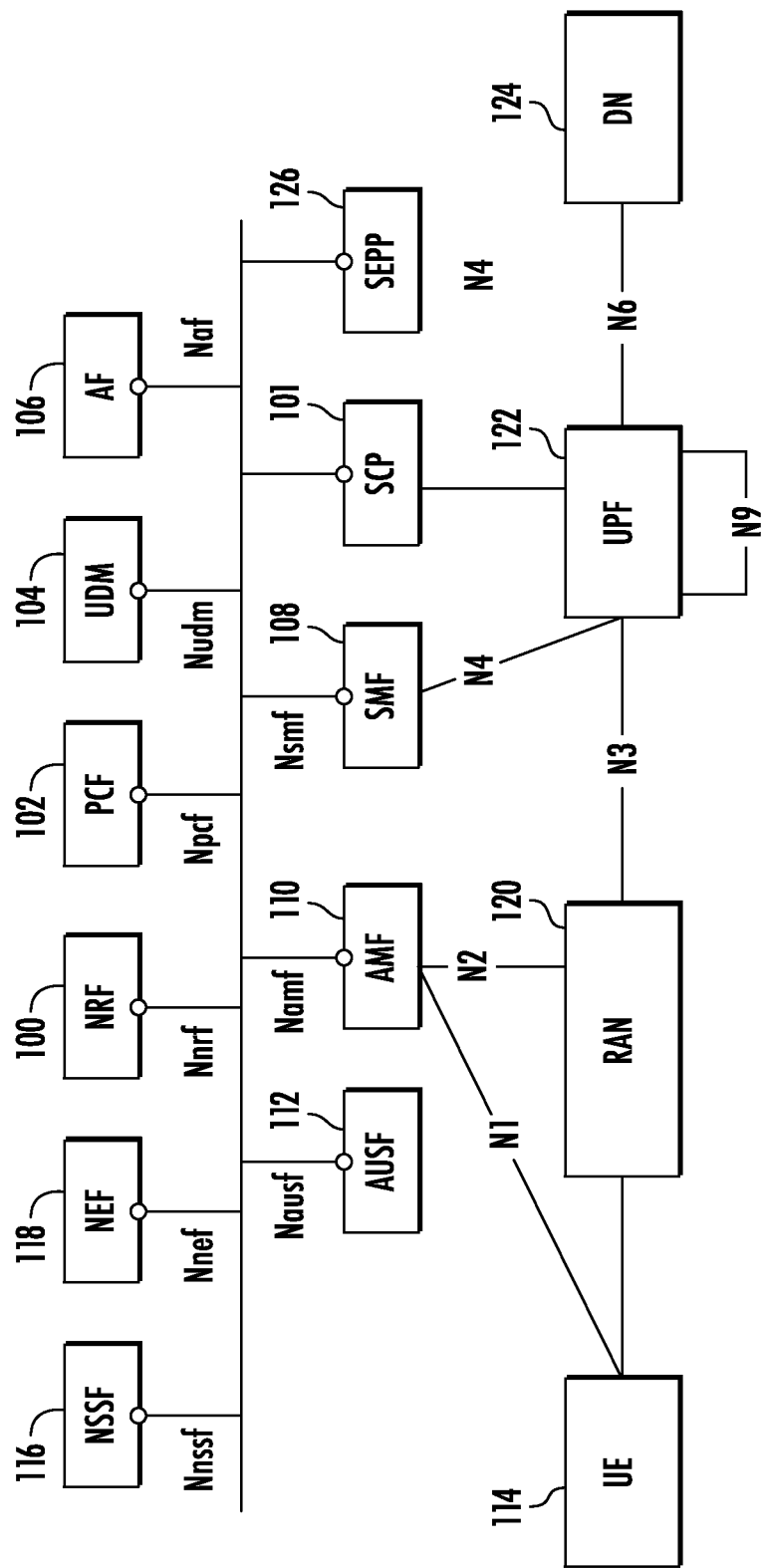
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address.

In FIG. 1, any of the network functions (other than NRF 100) can be consumer NFs producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As described above, one problem with the 3GPP network architecture for 5G networks is that consumer NFs that create subscriptions with remote NRFs may not be able to contact geo-redundant mated remote NRFs when the remote NRF with which a subscription was originally created fails.

Figure 2:
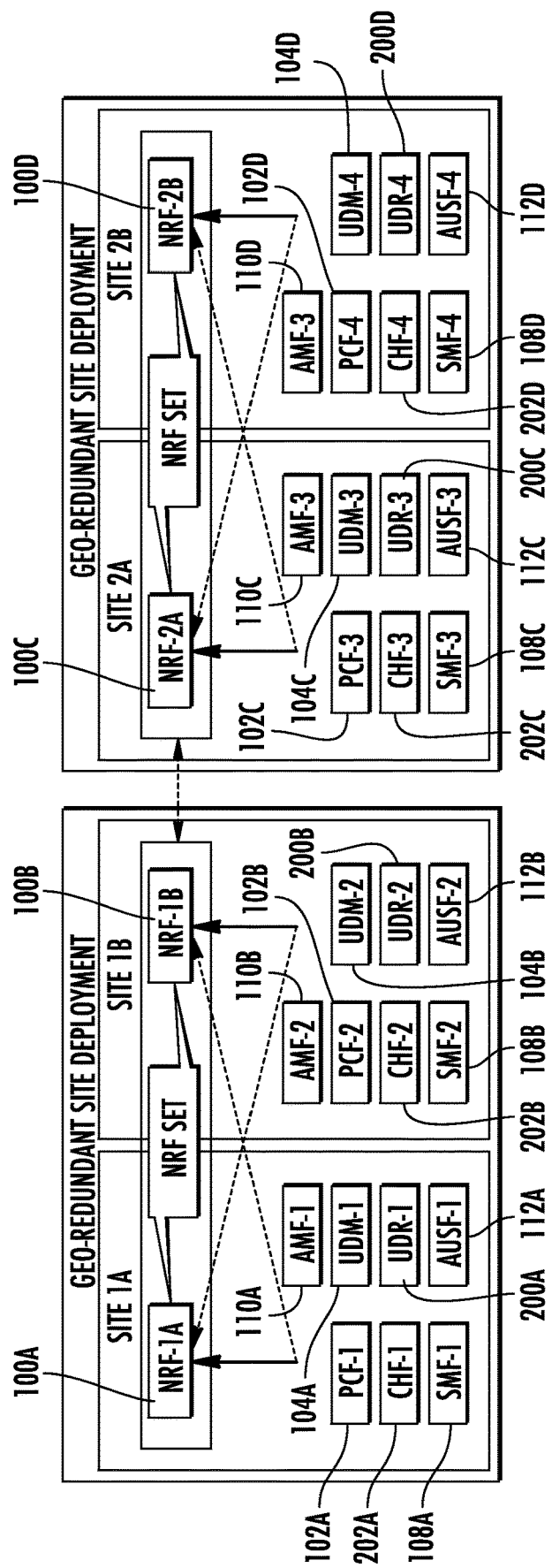
FIG. 2 is a network diagram illustrating an exemplary network architecture with geo-redundant NRF deployments.

FIG. 2 is a network diagram illustrating typical geo-redundant deployment of NFs in a 5G network. In FIG. 2, an operator may deploy mated pairs of NRFs at geographically diverse sites. In the illustrated example, NRFs 100A and 100B are a first mated pair respectively deployed at sites 1A and 1B, which may be part of the same data center at the same geographic location. NRFs 100A and 100B share network NF profile information and subscriptions to NF profiles and form an NRF set, which is a logical grouping of NRFs that can provide the same service.

The 5G core network elements described above with regard to FIG. 1 may also be deployed as mated pairs with geo-redundancy. In the example illustrated in FIG. 2 the mated pairs of NFs at sites 1A and 1B include AMFs 110A and 110B, UDMs 104A and 104B, unified data repositories (UDRs) 200A and 200B, AUSFs 112A and 112B, PCFs 102A and 102B, charging functions (CHFs) 202A and 202B, and SMFs 108A and 108B.

Similarly, the network operator may have mated NRFs and other 5G NFs located at a site that is geographically diverse from sites 1A and 1B. In FIG. 2, the geo-redundant mated NRFs located at sites 2A and 2B include NRFs 100C and 100D, which form a second NRF set. In addition, the other 5G NFs may also be deployed as mated pairs at sites 2A and 2B. In the illustrated example, these include AMFs 110C and 110D, UDMs 104C and 104D, UDRs 200C and 200D, AUSFs 112C and 112D, PCFs 102C and 102D, CHFs 202C and 202D, and SMFs 108C and 108D.

A network operator may have N NRF sets. In FIG. 2, N=2. Geo-redundant deployments are used to protect against site failures caused by natural disasters, power failures, etc. One problem with geo-redundant NRF deployments is that consumer NFs need to be aware of all of the NRF instances that are deployed geo-redundantly, which adds complexity at consumer NFs, increases operational overhead for configuring all NRF instances deployed as geo-redundant NRFs, and increases security attack surfaces.

In one service operation provided by 3GPP networks, specified in 3GPP TS 29.510 Section 5.2.2.5.4, when multiple NRFs are deployed in a PLMN, an NF instance can subscribe to changes of other NF instances registered with an NRF with which the NF instance is not directly interacting. The subscription message is forwarded by an intermediate forwarding NRF with which the subscribing NF is directly interacting. This scenario is illustrated in FIG. 3.

Figure 3:
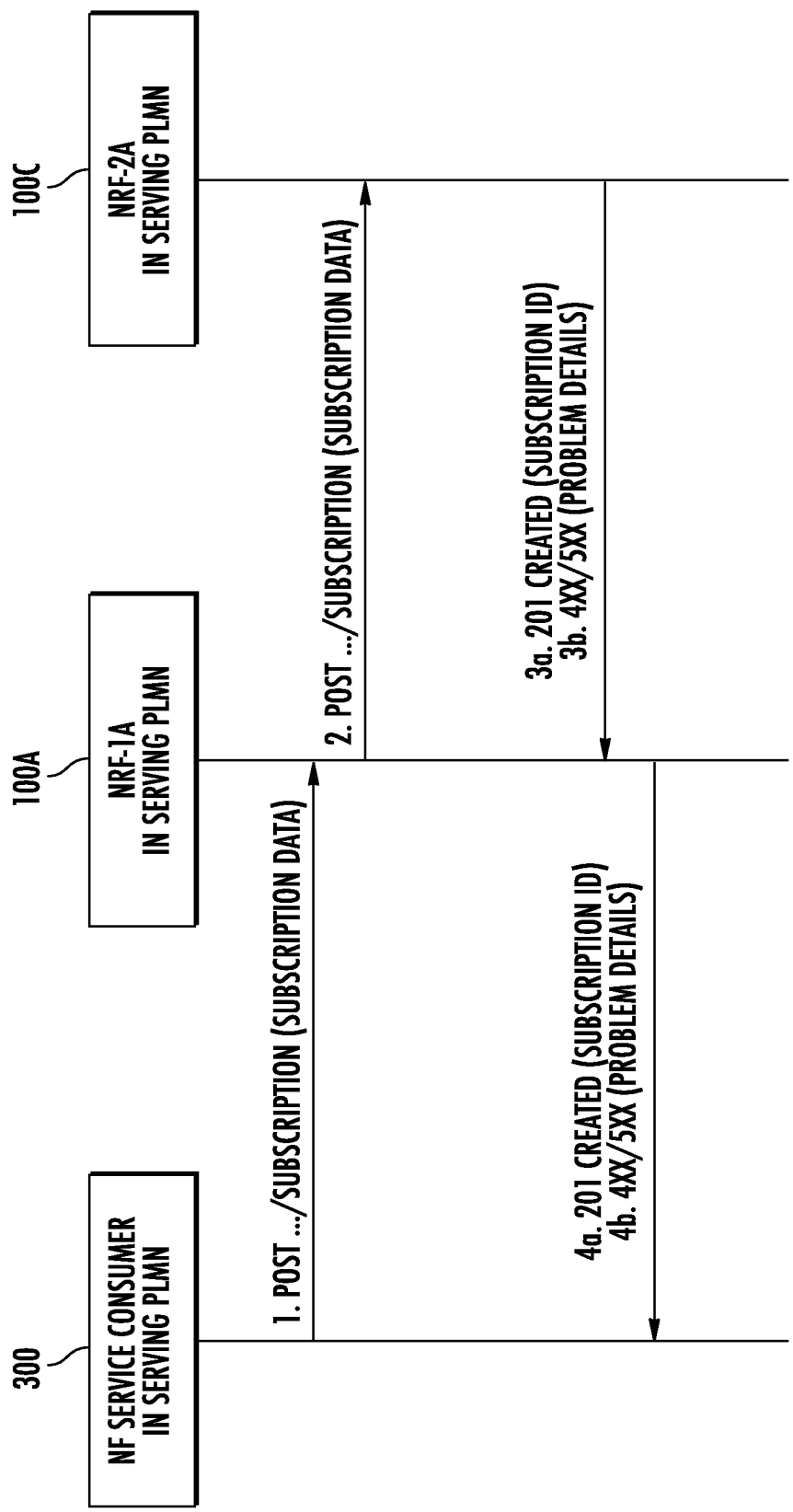
FIG. 3 is a message flow diagram illustrating forwarding of a create subscription request message by an intermediate forwarding NRF.

In FIG. 3, an NF consumer 300 in a serving PLMN interacts directly with NRF 100A but not within NRF 100C. As illustrated in FIG. 2, NRFs 100A and 100C may be located at geographically diverse sites, and consumer in NF 300 may not be aware of NRF 100C. Referring to the message flow in FIG. 3, in step 1, consumer NF 300 sends an HTTP POST message carrying a create subscription request to the NRF-1A 100A in the serving PLMN. The subscription request may be a request to invoke the NFStatusSubscribe service operation to receive notifications regarding the status of a producer NF. The request includes the SubscriptionData parameter in the request body. NRF-1A 100A receives the subscription request but does not have the NF profile information to fulfill the request. Accordingly, NRF-1A 100A sends the subscription request to a pre-configured NRF, which in the illustrated example is NRF-2A 100C. If NRF-2A 100C determines that it has NF profile information identified in the subscription request, NRF-2A 100C responds, as indicated in step 2a with a 201 Created response message indicating that the subscription has been created and including NF profile information for the NF instance identified in the subscription request. The response contains data related to the created subscription, including the validity time, as determined by the NRF, after which the subscription becomes invalid.

If NRF-2A 100C determines that it does not have the requested subscription data, NRF-2A 100C identifies the next hop NRF and forwards the subscription request to that NRF. The next hop NRF may be selected based on operator-configured parameters, such as priority and/or capacity. The next hop NRF may perform similar operations to NRF-2A 100C. The subscription request may be forwarded to NRFs until the NRF that has the requested subscription data is reached or there are no more NRFs in the service provider's network to contact.

In the illustrated example, it is assumed that NRF-2A 100C either has the requested subscription data or is the last NRF to contact in the service provider's network. If the subscription is successfully created (i.e., NRF-2A 100C has the requested subscription data and accepts the request), control proceeds to step 3a, where NRF-2A 100C returns a 201 Created message to NRF-1A 100A. The 201 Created message indicates that the subscription is successfully created and includes the subscription ID as well as other subscription data, such as validity time. The payload body of the 201 Created message shall contain the representation describing the status of the request and the "Location" header shall be present and shall contain the URI of the created resource. The authority and/or deployment-specific string of the apiRoot of the created resource URI may differ from the authority and/or deployment-specific string of the apiRoot of the request URI received in the POST request.

In step 4a, NRF-1 100A forwards the 201 Created message to consumer NF 300. After receiving the 201 Created message, consumer NF 300 corresponds directly with NRF-2 100-C.

If the subscription request fails (i.e., because NRF-2A 100C does not have the requested subscription data and is the last hop NRF in the network), control proceeds to step 3b where NRF-2A 100C returns a 4XX or 5XX message to NRF-1A 100A. In step 4b, NRF-1A 100A forwards the 4XX or 5XX error message to consumer NF 300.

Figure 4:
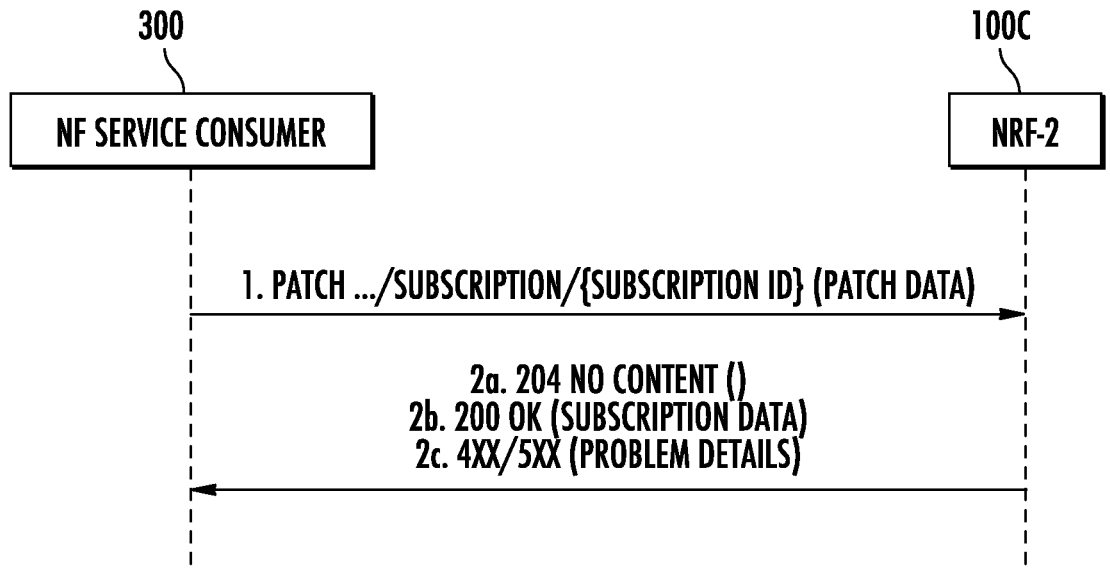
FIG. 4 is a message flow diagram illustrating an exemplary procedure for updating an existing NF subscription.

In some scenarios, a consumer NF may wish to modify or delete an existing subscription. One scenario in which a consumer NF may wish to modify a subscription is to change the validity time of the subscription to keep the subscription from expiring. Such a scenario is illustrated in FIG. 4. In FIG. 4, consumer NF 300 signals with NRF-2A 100C to update a subscription. As per 3GPP TS 29.510, section 5.2.2.5.6, a subscription to notifications regarding NF instances may be updated to refresh the validity time, when this time is about to expire. The NF service consumer may request a new validity time from the NRF, and the NRF answers with the new assigned validity time, if the operation is successful.

This operation is executed by updating the resource identified by "subscriptionID". The operation is invoked by issuing an HTTP PATCH request on the URI representing the individual resource received in the location header field of the 201 Created response received during a successful subscription. In line 1 of the message flow in FIG. 4, consumer NF 300 sends an HTTP PATCH message to NRF-2A 100C to update the subscription specified by the subscription ID in the PATCH message, which was received from NRF-2 100C in the 201 Created message (see FIG. 3). NRF-2A 100C will respond with a 204 No Content message, if NRF-2A 100C does not host the identified subscription, as indicated by step 2a in FIG. 4. NRF-2A 100C will respond with a 200 OK message if NRF-2A 100C hosts the identified subscription and the update is successful, as indicated by step 2b in FIG. 4. NRF-2 100C will respond with a 4XX or 5XX error message if NRF-2 100C experiences an error in updating the subscription, as illustrated by step 2c in FIG. 4.

The point to highlight here is that consumer NFs are not aware of all the NRF instances deployed as geo-redundant NRF sets and so will not be able to route to other NRF instances of the geo-redundant NRF-Set in case of failures. For example, if NRF-2A 100C fails after the subscription is created, consumer NF 300 will not be able to contact NRF-2B 100D (see FIG. 1) that is in the same NRF set as NRF-2A 100C to update a subscription because consumer NF 300 may not be aware that NRF-2B 100D exists.

Figure 5:
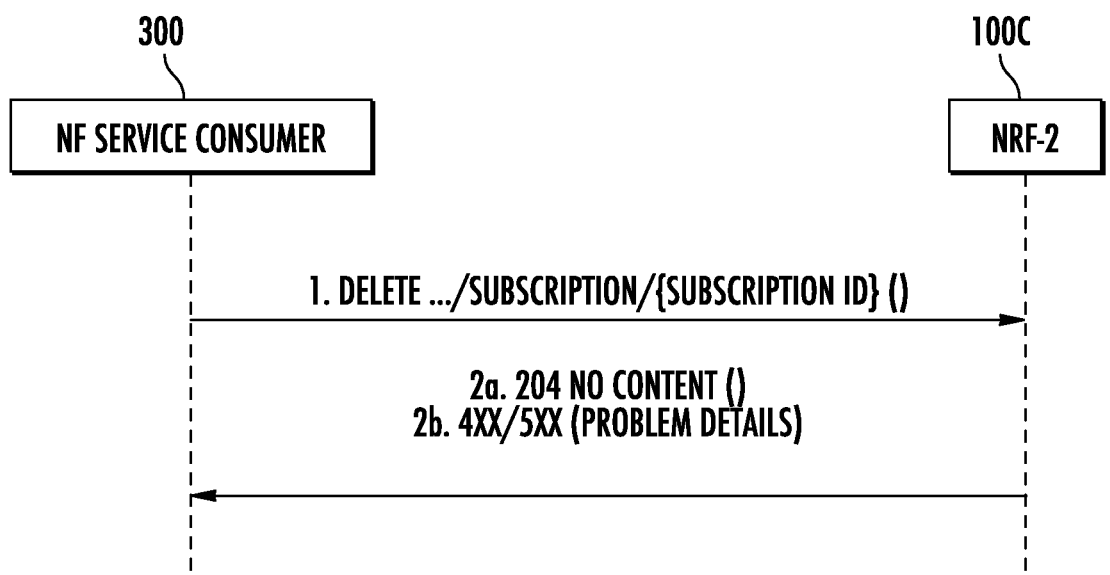
FIG. 5 is a message flow diagram illustrating an exemplary procedure for deleting an existing NF subscription.

Another scenario in which a consumer NF may wish to send a message to an NRF regarding an existing subscription is when the consumer NF desires to delete the subscription. This scenario is illustrated in FIG. 5.

In line 1, consumer NF 300 sends a delete message to NRF-2 100C. The delete message includes the subscription ID for the subscription identified in the 201 created response received from NRF-2A 100C (see FIG. 2). If the delete operation is successful, NRF-2A 100C returns a 204 No Content message, as indicated by step 2*a*. If the delete procedure results in an error, NRF-2A 100C returns a 4XX or 5XX error message with the error details, as indicated by step 2*b*. If NRF-2A 100C is unreachable and/or out of service and cannot respond to the delete message, NF consumer 300 may not be able to contact a mated NRF in the same NF set as NRF-2A 100C.

Figure 6:
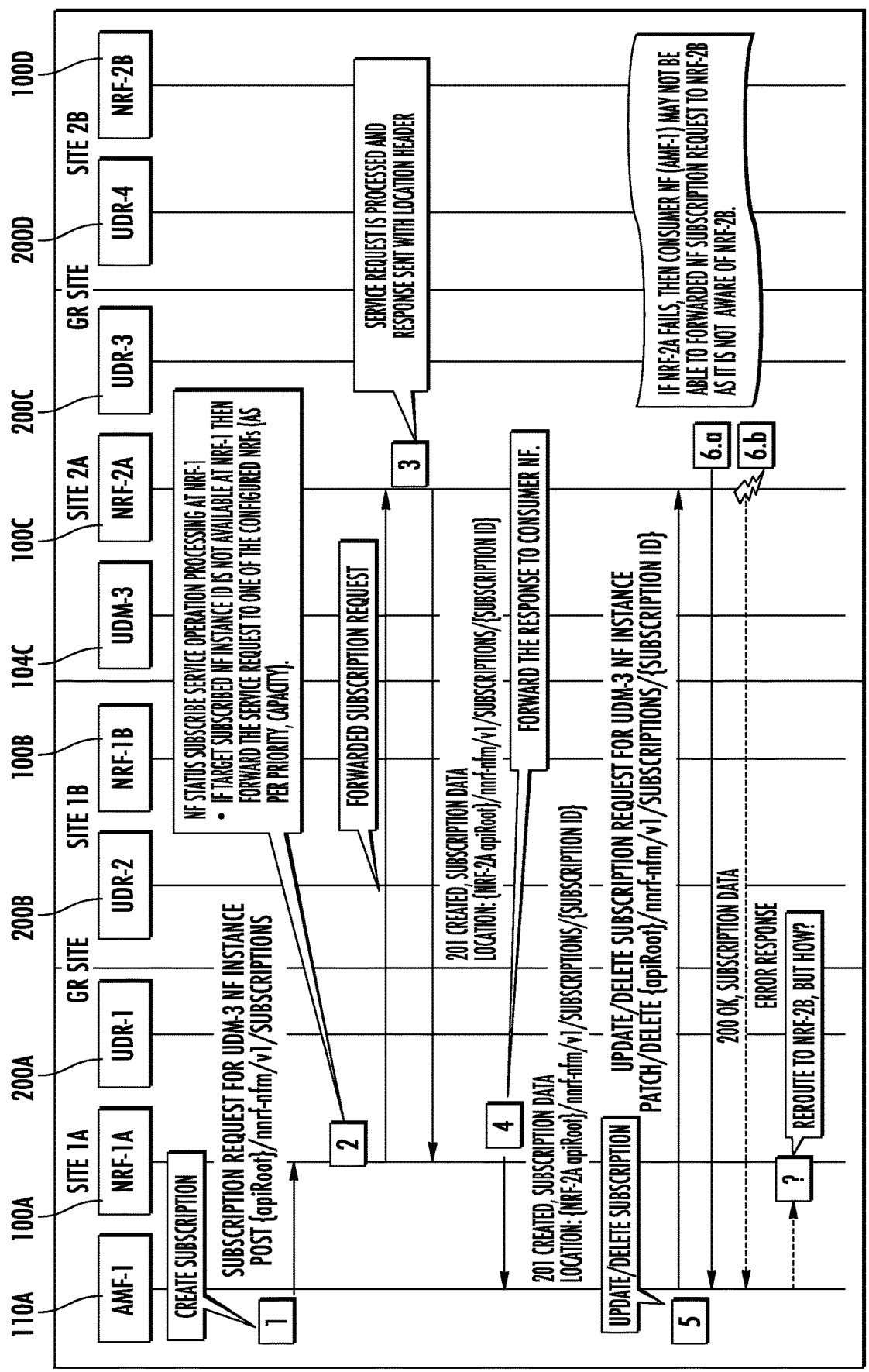
FIG. 6 is a message flow diagram illustrating failed routing of a message relating to an existing NF subscription when a remote NRF becomes unavailable.

FIG. 6 illustrates this problem in more detail. Referring to FIG. 6, NRFs 100A and 100B form a mated pair and NRFs 100C and 100D form a mated pair located at a geographically diverse site from NRFs 100A and 100B. In line 1 of the message flow in FIG. 6, AMF 110A sends a create subscription request message to create a subscription to receive updates regarding the status of UDM-3 104C. AMF 110A sends the subscription request to NRF-1A 100A. The create subscription request identifies UDM-3 104C as the NF instance to which in AMF 110A wishes to subscribe to receive updates.

NRF-1A 100A determines that it does not have the requested subscription data for the target NF instance ID indicated in the subscription request. Accordingly, NRF-1A 100A in line 2 forwards the subscription request to a next hop NRF based on operator configured criteria, which may include priority, capacity, load balancing, or other criteria. In the illustrated example, NRF-1A 100A forwards the subscription request to NRF-2A 100C located in site 2A.

In line 3 of the message flow diagram NRF-2A 100C determines that it has the requested NF instance data for UDM-3 104C and responds with a 201 Created message that includes a subscription ID and a location header identifying NRF-2 100C as the NRF that accepted the subscription. In line 4 of the message flow diagram NRF-1A 100A receives the subscription response an forwards the response to AMF-1 110A.

In line 5 the message flow diagram AMF-1 110A sends an update or delete subscription request to the NRF identified in the location header in the subscription response message received in line 4. In the illustrated example, the update or delete message is sent to NRF-2A 100C. Line 6*a* of the message flow diagram indicates the case where NRF-2A 101C has the requested subscription data and responds with a 200 OK message indicating that the subscription has been successfully updated. Line 6*b* of the message flow diagram illustrates the case where NRF-2A 100C fails and is unable to respond to the update or delete subscription request. AMF-1 110A is unable to contact NRF 2B 100D because AMF-1 110A is not aware of NRF-2B 100D.

In order to avoid the difficulty illustrated by step 2*b*, an intermediate forwarding NRF may modify a subscription response received from a remote NRF to identify itself as the locus of the subscription so that the intermediate forwarding NRF will receive subsequent messages concerning the subscription. In the event of failure of a remote NRF but not all of the NRFs in an NRF set, the intermediate forwarding NRF may forward the subsequent messages to one of the available remote NRFs in an NRF set. This scenario is illustrated in FIG. 7.

Figure 7:
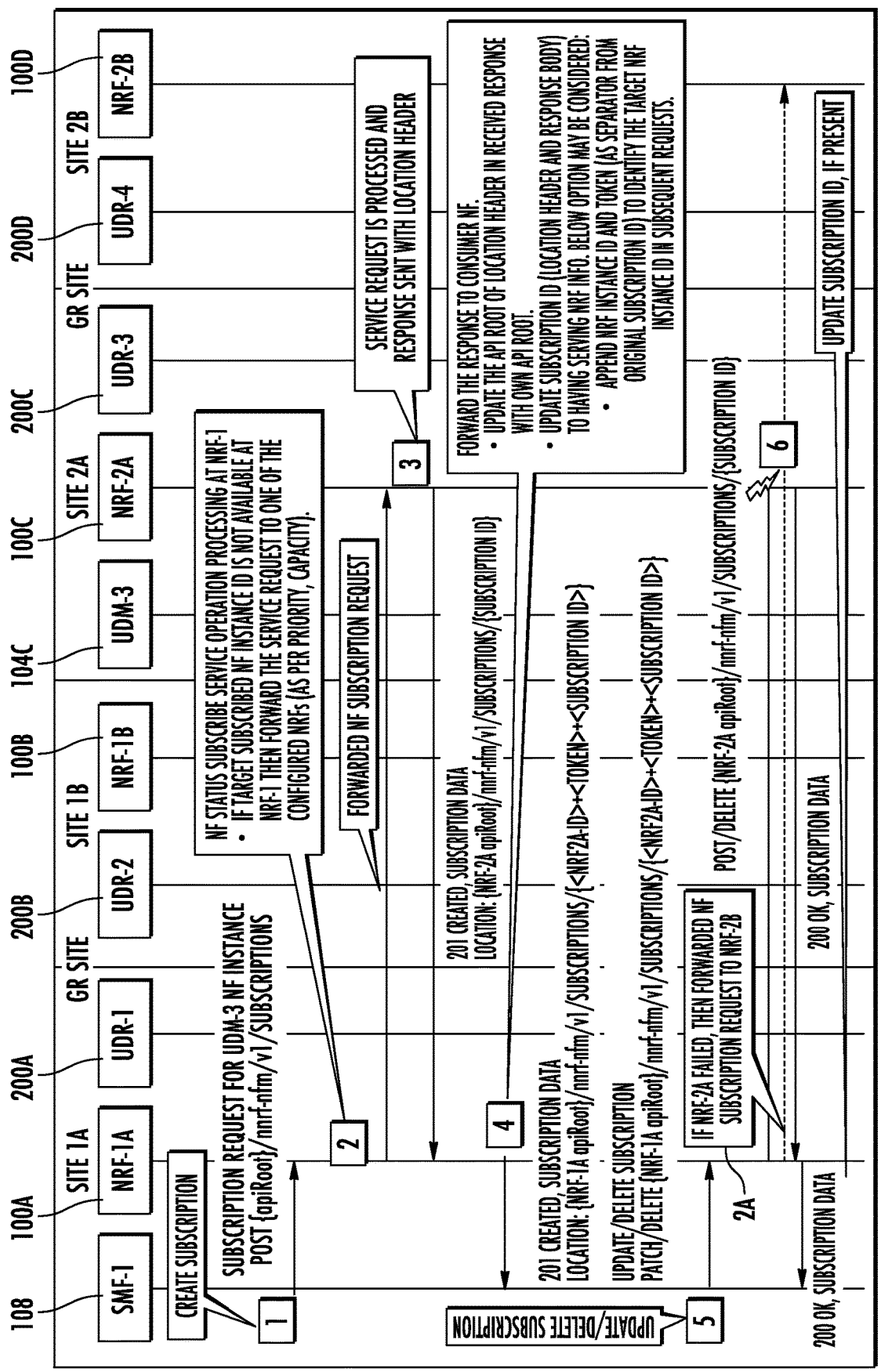
FIG. 7 is a message flow diagram illustrating optimized routing of a message relating to an existing NF subscription.

Referring to FIG. 7, in line 1, SMF-1 108 sends a create subscription request to subscribe to updates regarding UDM-3 104C. The create subscription request is sent to local NRF-1A 100A. In line 2, NRF-1A 100A, acting as an intermediate forwarding NRF, determines that it does not have the NF profile for UDM-3 104C accordingly, NRF-1A 100A forwards the create subscription request to the next hop NRF, which in the illustrated example is NRF-2A 100C. The next hop NRF may be selected based on operator configured parameters, such as priority or capacity.

In line 3 of the message flow diagram, NRF-2A 100C determines that it has the requested NF profile for UDM-3 104C and responds to the create subscription request by sending a 201 Created response message with the requested subscription data. The 201 Created response message includes a location header identifying NRF-2A 100C as the NRF that contains the NF profile information for the producer NF instance identified in the create subscription request. The 201 Created response message also includes a subscription identifier that identifies the subscription.

In line 4 of the message flow diagram, NRF-1A 100A receives the subscription response message and, prior to forwarding the subscription response message to the subscribing consumer NF, SMF-1 108, NRF 1A 100A modifies the subscription response by injecting its own identity, i.e., the identity of NRF-1A 100A, in the location header so that subsequent messages regarding the subscription will be sent to the intermediate forwarding NRF, NRF-1A 100A, instead of the NRF that includes the requested subscription data. In particular, NRF-1A 100A replaces the address or identity of NRF-2A 100C in the apiRoot of the location header of the response message with the address or identity of NRF-1A 100A. This can be seen in FIG. 7 where the apiRoot of the location header of the response message received by NRF-1A 100A in line 4 is NRF-2A, and the apiRoot of the location header of the response forwarded by NRF-1A 100A in line 4 is NRF-1A.

NRF-1A 100A appends the address or identity of the NRF that contains the subscription data to the location header of the response message along with a token that separates the address or identity of the NRF from the subscription ID. This is illustrated by "<NRF2A-ID>+<token>+<subscriptionID>" appended to the location header of the response message sent to SMF-1 108 in line 5. Here, "<token>" acts as a separator between the subscription ID and the ID or address of the NRF that contains the subscription data.

Thus, in the message sent from NRF-1A 100A to the subscribing consumer NF, SMF-1 108, NRF-1A 100A is identified as the NRF that contains the subscription data so that subsequent messages will be sent to NRF-1A 100A. The ID or address of the NRF that includes the requested subscription data obtained from the apiRoot of the location header of the original response message is appended to the end of the location header of the response message so that the intermediate forwarding NRF can identify the NRF or NRF set to which subsequent messages concerning the subscription should be forwarded.

In line 5, SMF-1 108 sends an update or delete message concerning the subscription to the NRF identified in the apiRoot of the location header of the response message received by SMF-1 108 in line 4. In the illustrated example, the update or delete message is sent to the intermediate forwarding NRF, NRF-1A 100A. The message includes a location header to which the identity of the NRF that includes the subscription data as well as the subscription ID are included or appended. In the update or delete message in line 5, the identity of the NRF that contains the subscription data and the subscription ID is indicated by "<NRF2A-ID>+ <token>+<subscriptionID>" at the end of the location header of the update or delete message. NRF-1A 100A, in response to receiving the update or delete message, determines, based on the presence of the identifier of the NRF that contains the subscription data that is appended to the location header of the response message, that the message should be forwarded to NRF-2A 100C, and forwards the update or delete message to NRF-2A 100C, as indicated by line 6. If NRF-2A 100C fails, NRF-1A 100A can resend the subscription update or delete message to NRF-2B 100D because NRF-1A 100A knows that NRF-2B 100D is a mate to NRF-2A 100C. In the message flow in FIG. 7, it is assumed that NRF-2A 100C does not fail. Accordingly, NRF-2A 100C in line 7 sends a 200 OK message to NRF 1A 100A, indicating that the subscription has been successfully updated. NRF-1A 100A forwards the 200 OK message to SMF-1 108.

Figure 8:
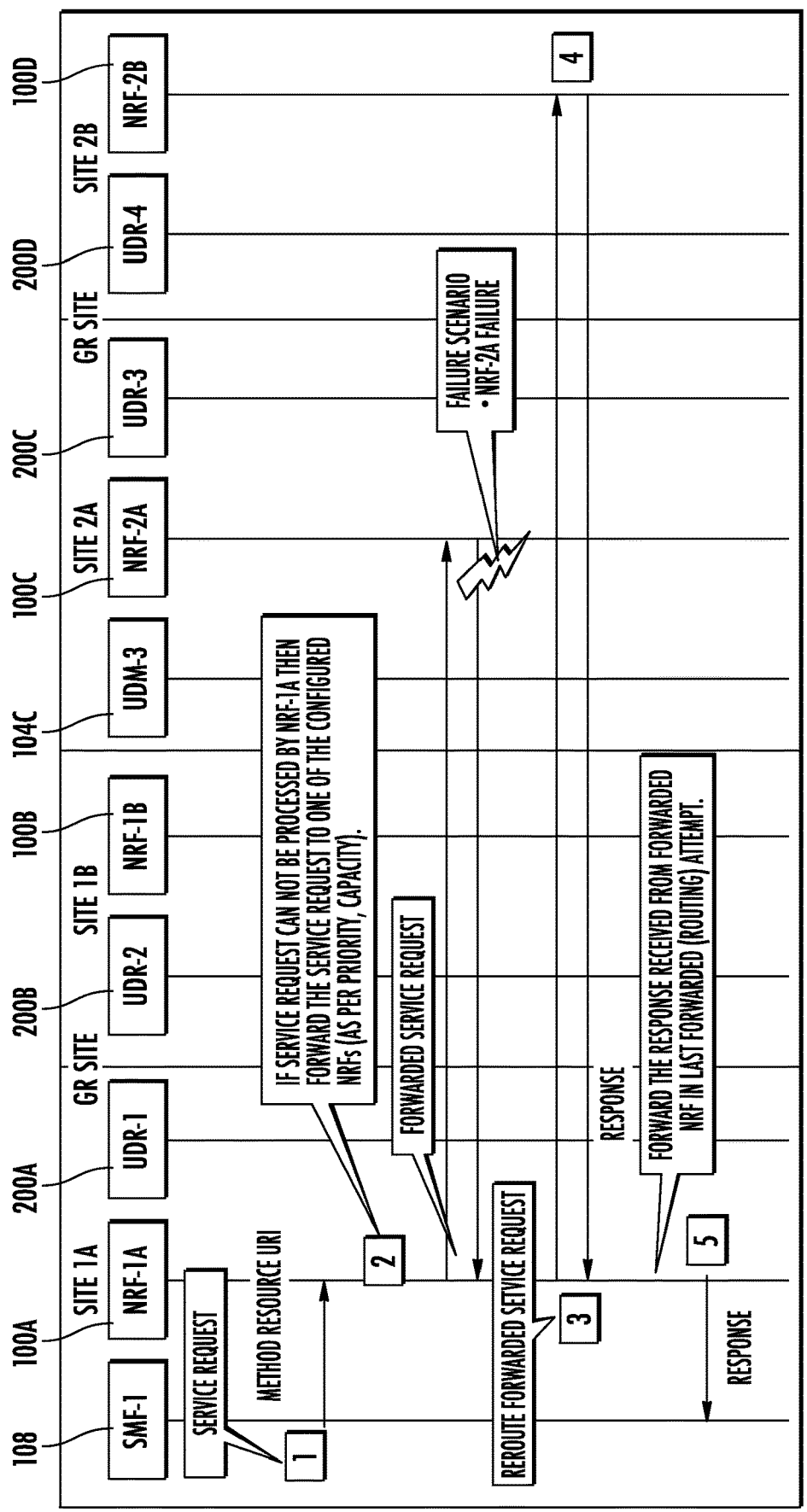
FIG. 8 is a message flow diagram illustrating optimized routing of a message relating to an existing NF subscription in response to an NRF failure.

FIG. 8 illustrates the case where a failure of a remote NRF results in a subsequent message relating to a subscription being forwarded to an alternate NRF. Referring to FIG. 8, in line 1, SMF-1 108 sends a service request message to NRF-1A 100A. The service request message may be a subsequent message relating to an existing subscription. NRF-1A 100A, in line 2 forwards the service request message to NRF-2A 100C based on the presence of the identifier for NRF-2A 100C appended to or otherwise included in the location header of the service request message. NRF-2A 100C experiences of failure and returns an error message to NRF-1A 100A. In line 3, NRF-1A 100A forwards the service request message to NRF-2B 100D, which is a mate of NRF-2A 100C. NRF-1A 100A is able to forward the service request message to the mate of NRF-2A 100C because NRF 100A may be configured with the NRF topology of all NRFs in a service provider's network, including the NRF sets to which each NRF belongs, and the mate NRFs that are included in each NRF set. Configuring NRFs with information about the topology of other NRFs in a service provider's network is a more scalable solution than configuring each consumer NF with the NRF topology in a service provider's network. In line 4, NRF-2B 100D processes the message and forwards a response to NRF-1A 100A. In line 5, NRF-1A 100A forwards the response message to SMF-1 108.

Figure 9:
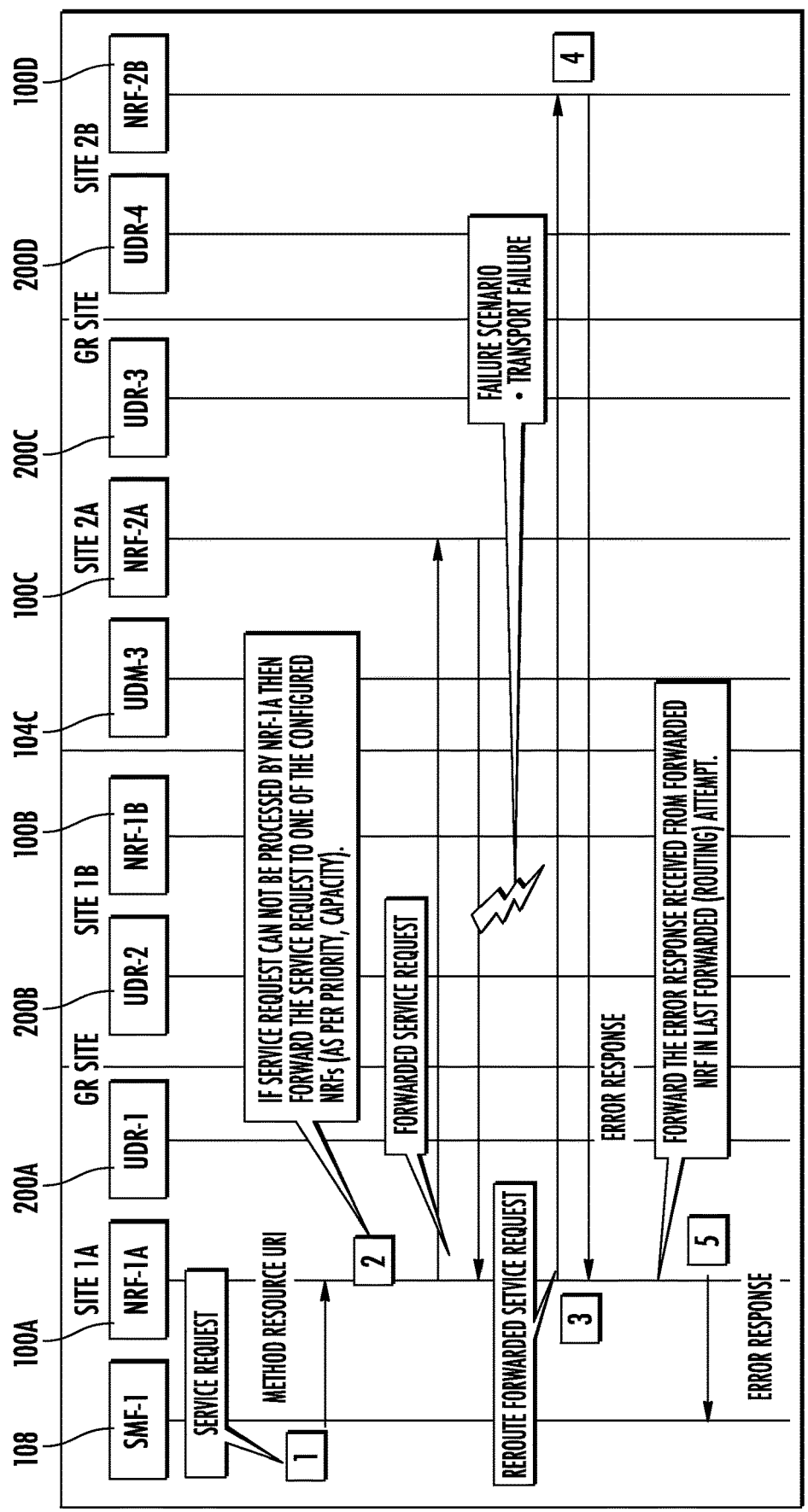
FIG. 9 is a message flow diagram illustrating optimized routing of a message relating to an existing NF subscription in response to a transport failure.

FIG. 9 illustrates the case where a transport failure between the intermediate forwarding NRF and one remote NRF of a mated pair results in a service request being redirected to a mate of the unreachable NRF. Referring to FIG. 9, in line 1, SMF-1 108 sends a service request message to NRF-1A 100A. The service request message may be a subsequent message relating to an existing subscription. NRF-1A 100A in line 2 forwards the service request message to NRF-2A 100C because the service request message includes the identity of NRF-2A 100C appended to or otherwise included in the location header of the service request message. A transport failure occurs, and NRF-1A 100A forwards the service request message to NRF-2B 100D, which is a mate of NRF-2A 100C. In line 4, NRF-2B 100D processes the message and forwards a response to NRF 1A 108. In line 5, NRF-1A 100A returns the response message to SMF-1 108.

Figure 10:
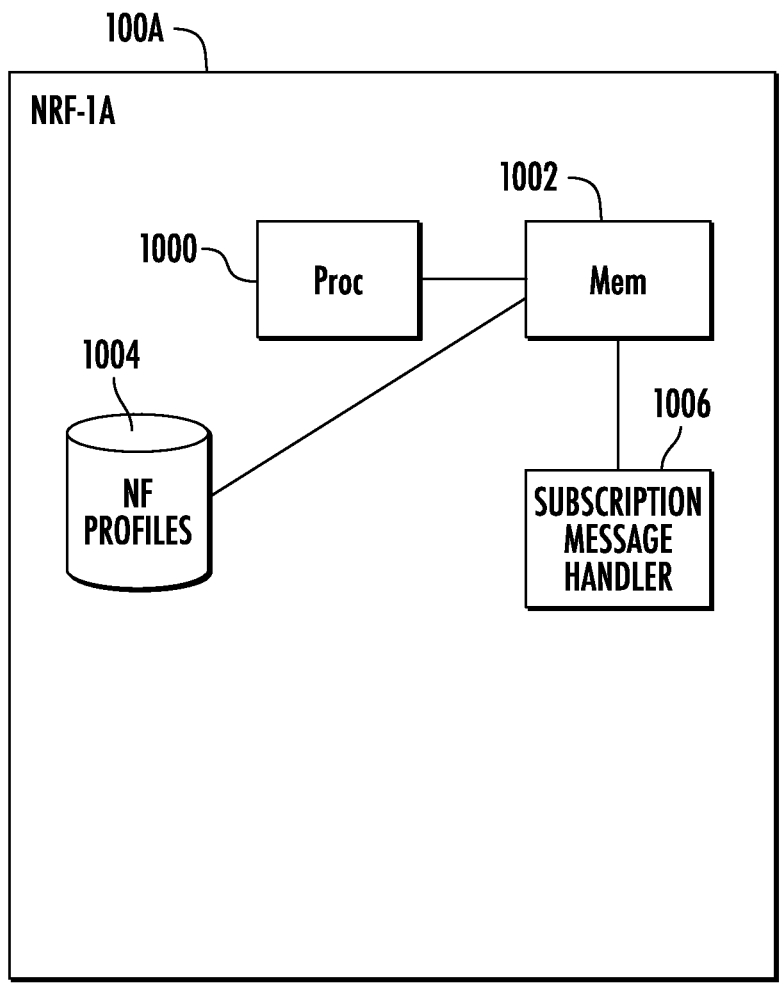
FIG. 10 is a block diagram illustrating an exemplary architecture for an NRF that implements optimized routing of messages relating to existing NF subscriptions.

FIG. 10 illustrates an exemplary architecture of intermediate forwarding NRF-1A 100A. In FIG. 10, NRF-1A 100A includes at least one processor 1000 and a memory 1002. NRF-1A 100A includes an NF profiles database 1004 that may be stored in memory 1002 for storing NF profiles of producer NF instances and maintaining subscriptions of consumer NF instances to the NF profiles. NRF-1A 100A further includes a subscription message handler 1006 that may be implemented by processor 1000 to process messages relating to subscriptions to NF profile instances. For example, subscription message handler 1006 may process create subscription request messages from consumer NF instances by creating or modifying records in NF profiles database 1004 to indicate consumer NF instances are subscribed to receive notifications regarding NF profiles of producer NF instances. Subscription message handler 1006 may also perform the functions described above of an intermediate forwarding NRF when NRF-1A 100A does not have an NF profile of a producer NF instance identified in a create subscription request message. As described above, these functions may include selecting an NRF using operator configured parameters and forwarding the create subscription request to the selected NRF. Subscription message handler 1006 may also perform the steps described above for processing a subscription response from a remote NRF. These steps may include modifying the subscription response message so that subsequent messages relating to the subscription will be routed to the local intermediate forwarding NRF, rather than directly to the remote NRF that includes the subscription data. Subscription message handler 1006 may also perform the steps described above of routing messages relating to existing subscriptions to remote NRFs or mates of the remote NRFs when the remote NRFs are unreachable.

Figure 11:
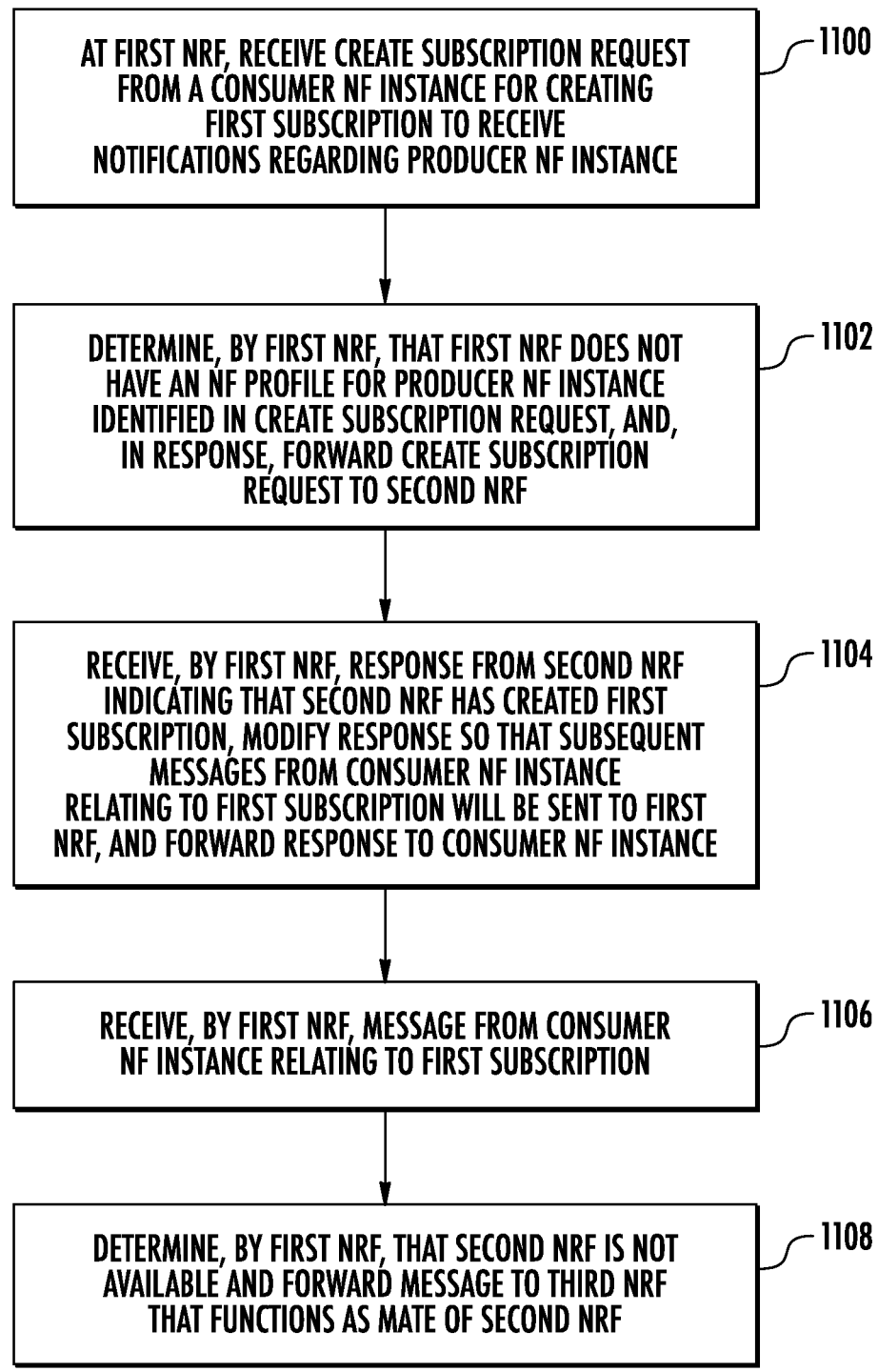
FIG. 11 is a flow chart illustrating an exemplary process for optimized routing of messages relating to existing NF subscriptions using an intermediate forwarding NRF.

FIG. 11 is a flow chart illustrating an exemplary process for routing of messages relating to existing NRF subscriptions. Referring to FIG. 11, in step 1100, the process includes receiving a create subscription request message at a first NRF to receive notifications regarding a producer NF instance. For example, NRF-1A 100A may receive create subscription request messages from any of the NFs illustrated in FIG. 1 that function as NF consumers. The create subscription request message may be a message for invoking the NFStatusSubscribe operation, as defined in section 5.2.2.5.1 of 3GPP TS 29.510.

In step 1102, the process includes determining, by the first NRF that the first NRF does not include NF profile data for the producer NF instance identified in the subscription request message. For example, NRF-1A 100A may determine that it does not include an NF profile for the NF instance ID identified in the create subscription request message.

In step 1104, the process includes receiving, by the first NRF, a response from the second NRF to which the subscription request message was forwarded. For example, NRF-1A 100A may receive a response to a subscription request message from a remote NRF that contains the NF profile information for the NF instance identified in the create subscription request. The response may be a 201 Created message that includes a location header with an apiRoot portion identifying the NRF that sent the response message. Step 1104 further includes modifying the response message so that subsequent messages relating to the subscription will be forwarded to the first NRF. For example, NRF-1A 100A may replace the apiRoot containing the NF instance ID of the remote NRF in the location header of the response message with the NF instance ID of NRF-1A 100A. NRF-A 100A may append the NF instance ID received in the location header of the response message to the end of the location header in the outgoing response message and separate, using a token, the NF instance ID from the subscription ID.

In step 1106, the first NRF receives a message relating to the first NF subscription from a consumer NF. For example, NRF-1A 100A may receive an update or delete message relating to an existing subscription. As stated above, one example of a subscription update message is a message to refresh the validity time of a subscription when the time is about to expire. The update message may be sent to the NRF using an HTTP PATCH message with the subscription ID of the requested subscription and patch data, such as a replace operation and a suggested new validity time.

As indicated by line 5 in FIG. 7, the subscription update or delete request is sent to the intermediate forwarding NRF rather than the remote NRF that contains the subscription because of the modification of the subscription response to the create subscription request to identify the intermediate forwarding NRF in the location header of the create subscription response. The update or delete request includes the identity of the intermediate forwarding NRF (NRF-1A 100A) in the apiRoot of the location header and also carries the identity of the remote NRF that hosts the subscription (NRF-2A 100C). Upon receiving the update or delete request, the intermediate forwarding NRF determines that the request should be forwarded to a remote NRF based on the presence of the remote NRF instance identifier appended to the location header of the service request message. However, in the example in FIG. 11, the first NRF determines, in step 1108, that the remote NRF identified in the message as hosting the subscription is unavailable. This determination may be made based on failure of NRF-1A 100A to receive a response from the remote NRF to a service request or a health status check message within a timeout period. In response to determining that the remote NRF is unavailable, NRF-1A 100A may forward the message relating to the existing subscription to mated NRF of the second NRF. For example, NRF-1A 100A may forward an update or delete message relating to an existing subscription to a mate of a remote NRF that is unavailable or otherwise unreachable.

Advantages of the subject matter described herein include network reachability from consumer NFs to all NRFs deployed in the network without requiring the consumer NFs to be configured with the identities of all the NRFs. By relying on an intermediate forwarding NRF to store the NRF topology information for the network, the scalability of the network architecture is increased over a solution where each consumer NF must be configured with all of the NRF topology information for a network. In addition, the solution described herein reduces the security surface for attacks, as all consumer NFs need not store the contact information of all NRFs.

The disclosure of each of the following references is hereby incorporated herein by reference in its entirety.

REFERENCES 1. 3GPP TS 23.502 V16.7.0 (2020-12), 3rd Generation Partnership Project; Technical Specification Group Services and System Aspects; Procedures for the 5G System (5GS); Stage 2, (Release 16).
2. 3GPP TS 23.501 V16.7.0 (2020-12), 3rd Generation Partnership Project; Technical Specification Group Services and System Aspects; System Architecture for the 5G System (5GS), Stage 2; (Release 16).
3. 3GPP TS 29.510 V17.0.0 (2020-12), 3rd Generation Partnership Project; Technical Specification Group Core Network and Terminals; 5G System; Network Function Repository Services; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimized routing of messages relating to existing network function (NF) subscriptions using an intermediate forwarding NF repository function (NRF), the method comprising:
    at a first NRF, receiving a create subscription request from a consumer NF instance for creating a first NF subscription to receive notifications regarding a producer NF instance;
    determining, by the first NRF, that the first NRF does not have an NF profile for the producer NF instance identified in the create subscription request and, in response, forwarding the create subscription request to a second NRF;
    receiving, by the first NRF, a response from the second NRF indicating that the second NRF has created the first NF subscription, modifying the response so that subsequent messages from the consumer NF associated with the first NF subscription will be sent to the first NRF, and forwarding the response to the consumer NF instance;
    receiving, by the first NRF, a message from the consumer NF instance relating to the first NF subscription; and
    determining, by the first NRF, that the second NRF is unavailable, and, in response, forwarding the message relating to the first NF subscription to a third NRF that functions as a mate of the second NRF.

2. The method of claim 1 wherein the second and third NRFs are located at a geographically diverse site from the first NRF.

3. The method of claim 1 wherein the first NRF comprises an intermediate forwarding NRF.

4. The method of claim 1 wherein determining that the first NRF does not have an NF profile for the producer NF instance identified in the create subscription request includes performing a lookup in an NF profile database maintained by the first NRF using an NF instance ID obtained from the create subscription request.

5. The method of claim 1 comprising, at the first NRF, selecting the second NRF to which the create subscription request is forwarded based on at least one of priority and capacity of the second NRF.

6. The method of claim 1 wherein modifying the response includes replacing an identifier or address of the second NRF in a location header of the response with an identifier or address for the first NRF.

7. The method of claim 6 wherein replacing the identifier or address of the second NRF in the location header of the response includes replacing the identifier or address of the second NRF with the identifier for the first NRF in an apiRoot of the location header of the response.

8. The method of claim 7 wherein modifying the response includes appending an identifier or address of the second NRF to the location header of the response.

9. The method of claim 8 wherein modifying the response includes using a token to separate the identifier or address of the second NRF from a subscription identifier.

10. The method of claim 1 wherein receiving the message relating to the first NF subscription includes receiving a message for updating or deleting the first NF subscription.

11. A system for optimized routing of messages relating to existing network function (NF) subscriptions using an intermediate forwarding NF repository function (NRF), the system comprising:
- a first NRF including at least one processor and a memory;
- an NF profiles database embodied in the memory for storing NF profiles of producer NF instances and maintaining subscriptions to the NF profiles by consumer NF instances; and
- an NF subscription message handler implemented by the at least one processor for:
  - receiving a create subscription request from a consumer NF instance for creating a first NF subscription to receive notifications regarding a producer NF instance;
  - determining, by the first NRF, that the first NRF does not have an NF profile for the producer NF instance identified in the create subscription request and, in response, forwarding the create subscription request to a second NRF;
  - receiving a response from the second NRF indicating that the second NRF has created the first NF subscription, modifying the response so that subsequent messages from the consumer NF associated with the first NF subscription will be sent to the first NRF, and forwarding the response to the consumer NF instance;
  - receiving a message from the consumer NF instance relating to the first NF subscription; and
  - determining that the second NRF is unavailable, and, in response, forwarding the message relating to the first NF subscription to a third NRF that functions as a mate of the second NRF.

12. The system of claim 11 wherein the second and third NRFs are located at a geographically diverse site from the first NRF.

13. The system of claim 11 wherein the first NRF comprises an intermediate forwarding NRF.

14. The system of claim 11 wherein, in determining that the first NRF does not have an NF profile for the producer NF instance identified in the create subscription request, the NF subscription message handler is configured to perform performing lookup in the NF profile database using an NF instance ID obtained from the create subscription request.

15. The system of claim 11 wherein the subscription message handler is configured to select the second NRF to which the create subscription request is forwarded based on at least one of priority and capacity of the second NRF.

16. The system of claim 11 wherein, in modifying the response, the NF subscription message handler is configured to replace an identifier or address of the second NRF in a location header of the response with an identifier or address for the first NRF.

17. The system of claim 16 wherein, in replacing the identifier or address of the second NRF in the location header of the response, the NF subscription message handler is configured to replace the identifier or address of the second NRF with the identifier or address of the first NRF in an apiRoot of the location header of the response.

18. The system of claim 17 wherein, in modifying the response, the NF subscription message handler is configured to append an identifier or address of the second NRF to the location header of the response and to use a token to separate the identifier or address of the second NRF from a subscription identifier.

19. The system of claim 11 the message relating to the first NF subscription comprises a message for updating or deleting the first NF subscription.

20. A non-transitory computer readable medium having stored thereon executable instructions that when executed by a processor of a computer control the computer to perform steps comprising:
- at a first network function (NF) repository function (NRF), receiving a create subscription request from a consumer NF instance for creating a first NF subscription to receive notifications regarding a producer NF instance;
- determining, by the first NRF, that the first NRF does not have an NF profile for the producer NF instance identified in the create subscription request and, in response, forwarding the create subscription request to a second NRF;
- receiving, by the first NRF, a response from the second NRF indicating that the second NRF has created the first NF subscription, modifying the response so that subsequent messages from the consumer NF associated with the first NF subscription will be sent to the first NRF, and forwarding the response to the consumer NF instance;
- receiving, by the first NRF, a message from the consumer NF instance relating to the first NF subscription; and
- determining, by the first NRF, that the second NRF is unavailable, and, in response, forwarding the message relating to the first NF subscription to a third NRF that functions as a mate of the second NRF.

* * * * *